United States Patent Office 3,160,219
Patented Dec. 8, 1964

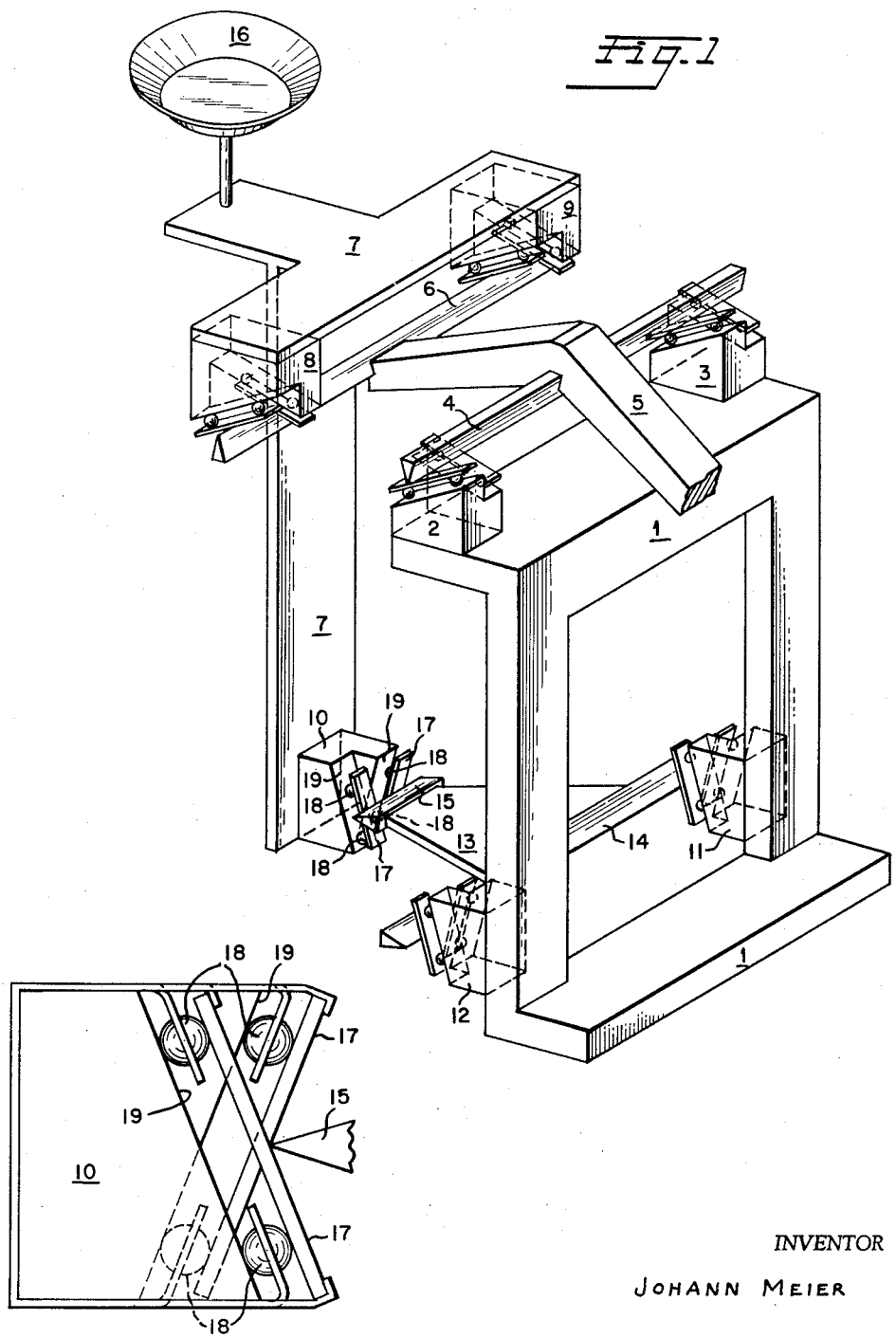

3,160,219
PRECISION BALANCES
Johann Meier, Stafa, Switzerland, assignor to Mepag, A.G., a corporation of Switzerland
Filed May 24, 1963, Ser. No. 283,077
Claims priority, application Switzerland, Nov. 9, 1962
13,181/62
4 Claims. (Cl. 177—198)

This invention relates to a precision balance and more particularly to a precision balance having two self-adjusting bearing units fixed to the frame of the balance for seating the central knife edge of the balance beam, and a pan carrier with two self-adjusting bearing units for supporting it on an outer knife-edge of the balance beam, wherein said pan carrier is guided for parallel movement by a steering lever.

An object of the invention is to provide in a balance of the type outlined, a steering lever with two knife-edges, one of which engages in a counter bearing fixed to the frame of the balance and the other of which engages in a counter bearing fixed to said pan carrier of the balance, one of said counter bearings comprising two self-adjusting bearing units and the other counter bearing consisting of only one self-adjusting bearing unit. Another object of the invention is a precision balance of the kind stated having a steering lever which is trapezoidal and has two parallel knife-edges of different lengths, the longer of which engages in the counter bearing comprising two self-adjusting bearing units. Preferably the scale pan is mounted on the pan carrier so that it juts out far enough for the three self-adjusting bearing units for said steering lever to be loaded only in compression. A still further object of the invention is a precision balance wherein all seven of said self-adjusting bearing units are of the same construction, each of which comprising two flat intermediate plates lying in intersecting planes for supporting the respective knife-edge, and each intermediate plate being mounted for rolling movement on an associated support.

These and other objects and the advantages of the invention will best be understood from the following description of a specific embodiment when read in connection with the accompanying drawing, in which:

FIGURE 1 is a perspective view, with certain parts omitted for clarity, of the improved precision balance; and FIGURE 2 is a detailed side elevational view of a bearing block including the ball cage means.

Fixed to the frame 1 are two spaced self-adjusting bearing units 2 and 3, on which the central knife 4 of the balance beam 5—of which only a fragment is shown—is seated. The pan carrier 7 is supported on the outer knife 6 of the beam 5, again by two self-adjusting bearing units 8 and 9. In order that the pan carrier can be guided for parallel movement, there is only one self-adjusting bearing unit 10 at the bottom thereof, while two such bearing units 11 and 12 are fixed to the opposed portion of the frame 1. A trapezoidal steering lever 13 is placed between the bearing unit 10 of the pan carrier and the bearing units 11 and 12 on the frame, the longer knife 14 of the lever engaging in the two bearing units 11 and 12 and the shorter knife 15 thereof engaging in the bearing unit 10. In order that the bearing units 10, 11, 12 cooperating with the steering lever 13 should always be loaded only in compression, the scale-pan 16 is mounted on the pan carrier 7 so that it juts out a suitable distance at one side.

All the self-adjusting bearing units 2, 3, 8, 9, 10, 11, and 12 participating in the parallel guiding of the pan carrier 7 are basically of the same construction. The construction which is preferable will be briefly explained with reference to the unit 10. The knife 15 to be mounted bears on two intermediate plates 17 lying in intersecting planes and each plate 17 is adapted to roll in all directions on an associated counter bearing 19 with the aid of two balls 18. The two bearings 19 of the unit lie in intersecting planes; in contrast to the intermediate plates 17, however, the two bearings 19 are integral and, in the case of the unit 10, are fixed to the lower end of the pan carrier 7. In a self-adjusting bearing unit of this type the two intermediate plates 17 always tend to move into snug engagement with the knife 15 to be mounted. In order that the plates 17 and the balls 18 can be brought into a rest position when the bearing unit 10 is not loaded, weak springs are provided to act on the bearings 19. As shown in FIGURE 2, the springs may be designed as ball-cages for the balls 18. It is possible to use other embodiments of self-adjusting bearing units but the type indicated has proved particularly advantageous in the practical realization of the present invention.

In the balance described, substantially no jamming can occur during the whole parallel guiding of the pan carrier 7, even if there are slight displacements longitudinally of the knife edges. The effective length of the steering lever 13 remains constant because displacements longitudinally of the knife-edges generally only result in the intermediate plates 17 of the bearing unit 10 rolling in this longitudinal direction. Similarly, slight adjustment errors have no effect so far as the danger of jamming is concerned. The whole parallel guiding of the pan carrier 7 is no longer a delicate matter and a high degree of accuracy and sensitivity can be obtained for the whole balance.

I claim:

1. A precision balance, comprising
a frame member;
a first pair of horizontally-spaced self-adjusting bearing units mounted on the upper portion of said frame member;
balance beam means including a balance beam, a horizontal central knife connected with said balance beam and cooperating with said first pair of bearing units to support said balance beam for pivotal movement relative to said frame, and an outer knife connected with said balance beam parallel with and spaced from said central knife;
pan carrier means including a pan carrier member, and a second pair of horizontally-spaced self-adjusting bearing units connected with said pan carrier member and cooperating with said outer knife to pivotally support said pan carrier means, said pan carrier having a vertically extending portion parallel with said frame;
steering lever means vertically spaced from said balance beam means for guiding said pan carrier member to effect vertical movement thereof parallel with said frame, said steering lever means comprising a generally horizontal steering lever intermediate said frame and the vertically extending portion of said pan carrier member, and a pair of horizontal parallel knives connected with the ends of said steering lever, respectively;
a third pair of horizontally-spaced self-adjusting bearing units connected with one of said frame and pan carrier members for pivotal cooperation with one of said steering lever knives; and
an additional self-adjusting bearing unit connected with the other of said frame and pan members for pivotal cooperation with the other of said steering lever knives, each of said self-adjusting bearing units comprising a bearing element including a pair of flat bearing surfaces lying in intersecting planes, a pair of intermediate flat plates parallel with and spaced from said bearing surfaces, respectively, and ball means intermediate said plates and said bearing surfaces, the sides of said plates remote from said ball means being adapted for pivotal engagement with the edge of the corresponding knife.

2. Apparatus as defined in claim 1 wherein said third pair of bearing units are connected with the vertically extending portion of said pan carrier.

3. Apparatus as defined in claim 1 wherein said steering lever is of a trapezoidal configuration and wherein said steering lever knives are of unequal length, the longer of said steering lever knives being in pivotal engagement with said third pair of bearing units.

4. Apparatus as defined in claim 1 wherein said pan carrier means further includes a scale pan spaced from said outer knife on the side thereof remote from said central knife to effect compressional loading of the three bearing units associated with said steering lever.

References Cited by the Examiner

UNITED STATES PATENTS

| | | |
|---|---|---|
| 1,065,844 | 6/13 | Sartorius. |
| 1,734,129 | 11/29 | Henderson _____ 308—2 |
| 2,097,025 | 10/37 | Flanagan _____ 177—198 |
| 2,622,938 | 12/52 | Van Duyn. |
| 2,692,771 | 10/54 | Holt _____ 177—198 |
| 2,914,361 | 11/59 | Turner _____ 308—2 |
| 3,074,765 | 1/63 | Hadley _____ 308—2 |

FOREIGN PATENTS 225,587    4/44    Switzerland.

LEO SMILOW, *Primary Examiner.*